United States Patent [19]

Fusco et al.

[11] Patent Number: 5,538,311
[45] Date of Patent: Jul. 23, 1996

[54] VISOR MOUNTING BRACKET WITH INTEGRAL STORAGE

[75] Inventors: Christopher R. Fusco, Grand Rapids; Philip C. George, Holland, both of Mich.

[73] Assignee: Price Corporation, Holland, Mich.

[21] Appl. No.: 229,363

[22] Filed: Apr. 18, 1994

[51] Int. Cl.⁶ .................................................. B60R 7/05
[52] U.S. Cl. ...................... 296/97.5; 296/97.9; 40/593; 40/658; 224/312
[58] Field of Search ............................ 296/97.1, 97.5, 296/97.9, 97.12, 97.13, 37.7, 37.8; 40/593, 643, 658; 224/277, 312; 248/231.8, 289.1, 291, 316.7; 24/13, 67.9, 563, 231.81, 289.31, 296.1

[56] References Cited

U.S. PATENT DOCUMENTS

| | | | |
|---|---|---|---|
| 2,549,200 | 4/1951 | Hooks | 24/67.9 |
| 2,637,128 | 5/1953 | Weeks | 40/643 |
| 2,726,757 | 12/1955 | Kellstrom | 206/84 |
| 2,867,925 | 1/1959 | Botts | 40/658 |
| 4,226,006 | 10/1980 | Toyama | 24/3.12 |
| 4,227,241 | 10/1980 | Marcus | 362/61 |
| 4,275,913 | 6/1981 | Marcus | 296/37.1 |
| 4,275,916 | 6/1981 | Skogler | 296/97.5 |
| 4,679,843 | 7/1987 | Spykerman | 296/97.1 |
| 4,763,946 | 8/1988 | Robbins et al. | 296/97.1 |
| 5,004,289 | 4/1991 | Lanser et al. | 296/97.12 |
| 5,007,532 | 4/1991 | Binish | 296/97.1 |
| 5,061,005 | 10/1991 | Van Order et al. | 296/97.9 |
| 5,066,154 | 11/1991 | Renaud | 401/131 |
| 5,074,508 | 12/1991 | Powers | 248/291 |

*Primary Examiner*—Andrew C. Pike
*Attorney, Agent, or Firm*—Price, Heneveld, Cooper, DeWitt & Litton

[57] ABSTRACT

A visor includes an elbow bracket assembly for attaching the visor to a vehicle. The elbow bracket assembly has a bezel with a flange extending from an edge thereof in spaced relationship to the vehicle roof for receiving an object to be held between the flange and the vehicle roof. In another embodiment of the invention, a visor body includes an elbow bracket assembly at one end and an auxiliary visor clip mounted to an edge of the visor at an end remote from said assembly. The auxiliary visor clip includes a bezel having a flange extending therefrom in spaced relationship to the visor body for receiving planar objects under said flange and held between the flange and visor body. In yet another embodiment of the invention, a visor includes both a storage clip under the elbow bracket assembly bezel and an auxiliary visor clip bezel. In yet another embodiment of the invention the bezel associated with one or more of the visor mounting brackets may include a longitudinally extending semicircular resilient socket for receiving cylindrical objects such as pencils therein. In a further embodiment of the invention, the visor may also integrally or separately include a generally U-shaped storage clip extending over an edge of the visor with an outwardly extending flange for receiving objects thereunder.

19 Claims, 3 Drawing Sheets

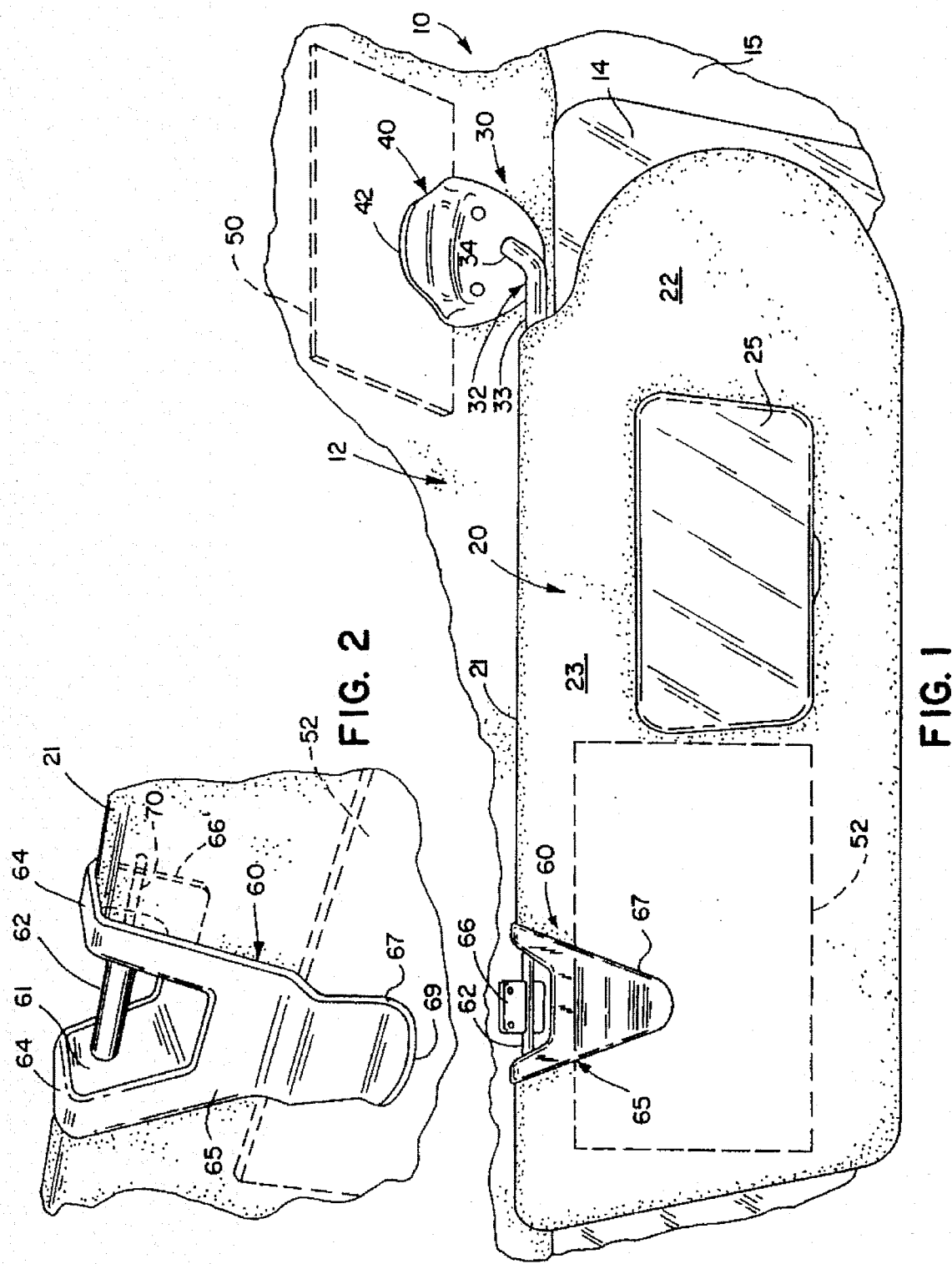

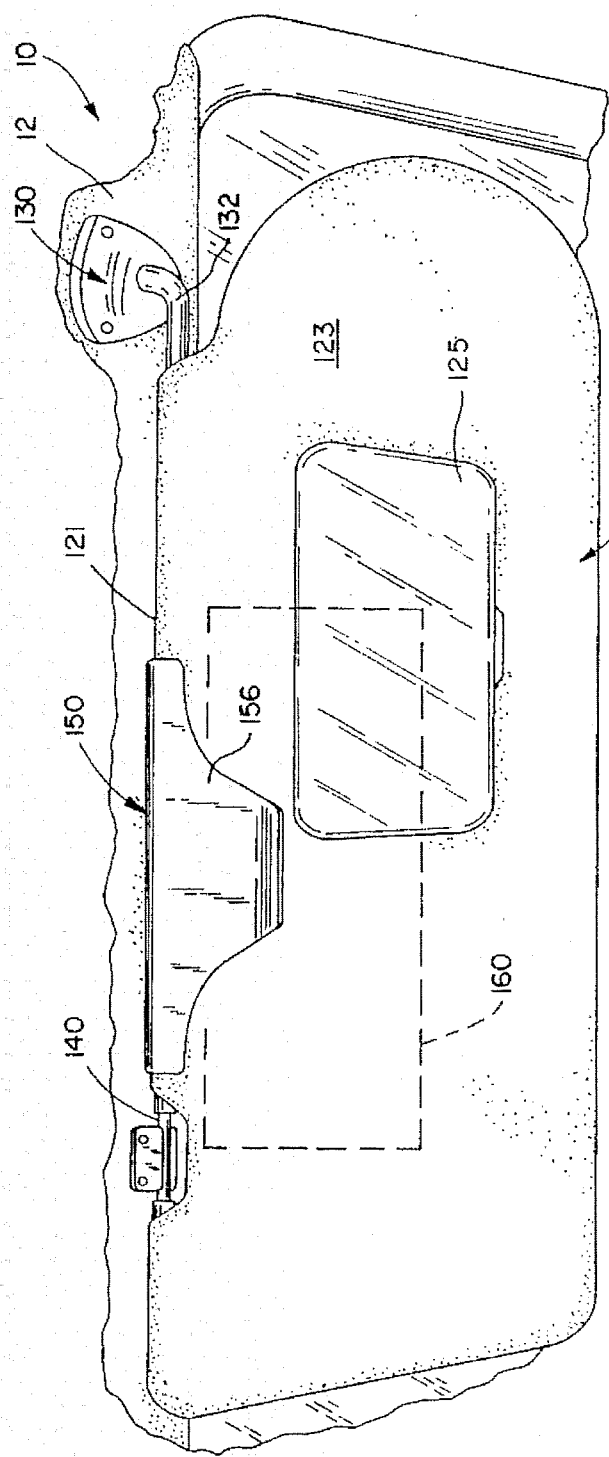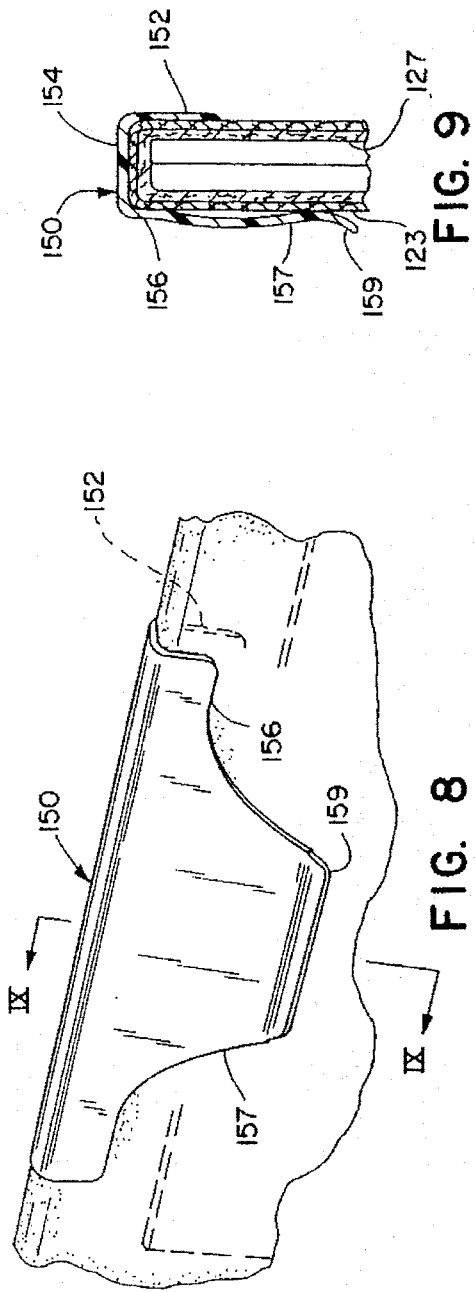

VISOR MOUNTING BRACKET WITH INTEGRAL STORAGE

BACKGROUND OF THE INVENTION

The present invention relates to vehicle visors and particularly to visor mounting brackets for attaching a visor to a vehicle.

Vehicles visors, which are necessary safety features on vehicles and are universally used for providing sun blocking protection, have found secondary uses such as being used as a carrier for illuminated vanity mirror assemblies, garage door opening transmitters, and even cellular telephones. Visors have also been employed for providing auxiliary storage of items such as sunglasses as for example as disclosed in U.S. Pat. No. 4,275,916. On occasion, visors include a strap formed on the visor body for receiving, for example, a map or other flat object which can be fitted under the strap. Also, there have been suggested a variety of clip-on devices for visors for holding maps, parking tickets, and other objects. U.S. Pat. Nos. 2,637,128; 2,867,925; and 5,074,508 disclose such clip-on visor storage devices.

While such devices provide supplemental utility to file visors, they frequently are relatively unattractive aftermarket devices which do not conform to the vehicle interior appearance and in some cases may pose a safety hazard inasmuch as they project sharp corners from the visor which, in the event of an accident, can be harmful.

SUMMARY OF THE PRESENT INVENTION

The visor of the present invention overcomes the deficiency of aftermarket auxiliary visor storage devices and the safety hazard provided thereby by integrally including within the visor mounting brackets themselves one or more clips which can be employed for holding a variety of relatively small planar objects. Visors and visor mounting brackets according to the present invention include, in one embodiment, a visor body with an elbow bracket assembly mounted thereto for attaching the visor body to a vehicle. The assembly includes a bezel with a flange extending from an edge therefrom in spaced relationship to the vehicle roof for receiving an object held between the flange and the vehicle roof. In another embodiment of the invention, a visor body includes an elbow bracket assembly at one end and an auxiliary visor clip mounted to an edge of the visor at an end remote from said assembly. The auxiliary visor clip includes a bezel having a flange extending therefrom in spaced relationship to the visor body for receiving planar objects under said flange and held between the flange and visor body. In yet another embodiment of the invention, a visor includes both a storage clip under the elbow bracket assembly bezel and an auxiliary visor clip bezel.

In yet another embodiment of the invention the bezel associated with one or more of the visor mounting brackets may include a longitudinally extending semi-circular resilient socket for receiving cylindrical objects such as pencils therein.

In yet a further embodiment of the invention, the visor may integrally include a generally U-shaped storage clip extending over an edge of the visor with an outwardly extending flange for receiving objects thereunder.

In all of these embodiments the visor integrally includes, when manufactured, the visor mounting brackets and integral storage devices so as to provide a visor with an appearance conforming to that of the vehicle interior. The invention provides unique storage locations which do not interfere with visor operation or other supplemental uses of the visor body for items such as illuminated vanity mirrors and the like. These and other features, objects, and advantages of the present invention will become apparent upon reading the following description thereof together with reference to the accompanying drawings in which:

BRIEF DESCRIPTION OF THE DRAWINGS

FIG. 1 is a fragmentary perspective view of a vehicle including a visor embodying the present invention;

FIG. 2 is an enlarged fragmentary perspective view of a portion of the visor shown in FIG. 1;

FIG. 7 is a fragmentary perspective view of a vehicle showing a visor integrally including another form of a visor storage clip;

FIG. 8 is an enlarged fragmentary perspective view of a portion of the visor and the storage clip shown in FIG. 7; and FIG. 9 is a cross-sectional view taken along section line IX—IX of FIG. 8.

DETAILED DESCRIPTION OF THE PREFERRED EMBODIMENT

Figure 3:
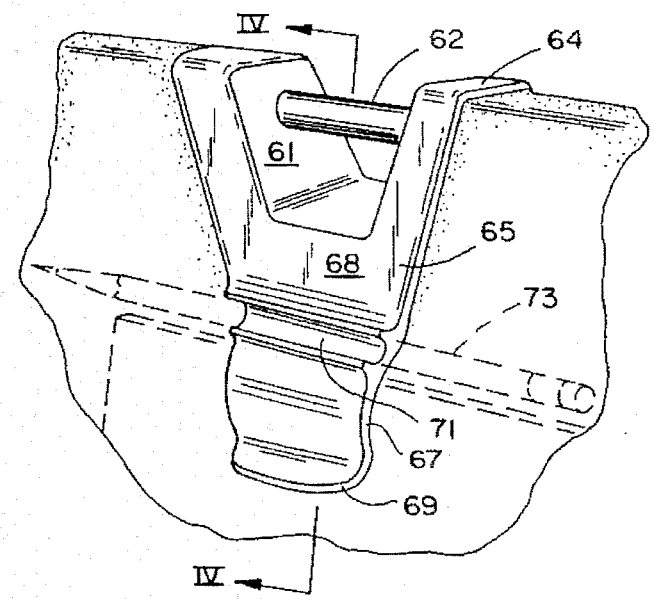
FIG. 3 is a perspective view of an alternative embodiment of the structure shown in FIG. 2.

Referring initially to FIG. 1 there is shown a vehicle 10 such as an automobile having a roof 12 and front windshield 14 with a visor assembly 20 embodying the present invention mounted to the roof adjacent the upper edge of windshield 14 and the A pillar 15 of the vehicle. The visor assembly 20 can have a butterfly-type visor core construction of the type disclosed in U.S. Pat. Nos. 4,763,946 or 5,007,532 made of either a polymeric material or fiberboard. Such construction includes a pair of core halves integrally joined along the top edge 21 of the visor and folded over to define the visor body which is covered by a suitable upholstery material 22 to conform the visor appearance to that of the vehicle interior. The visor may also include a covered illuminated vanity mirror assembly 25 located centrally within the visor body and which can be of the type disclosed in U.S. Pat. No. 4,227,241.

Figure 5:
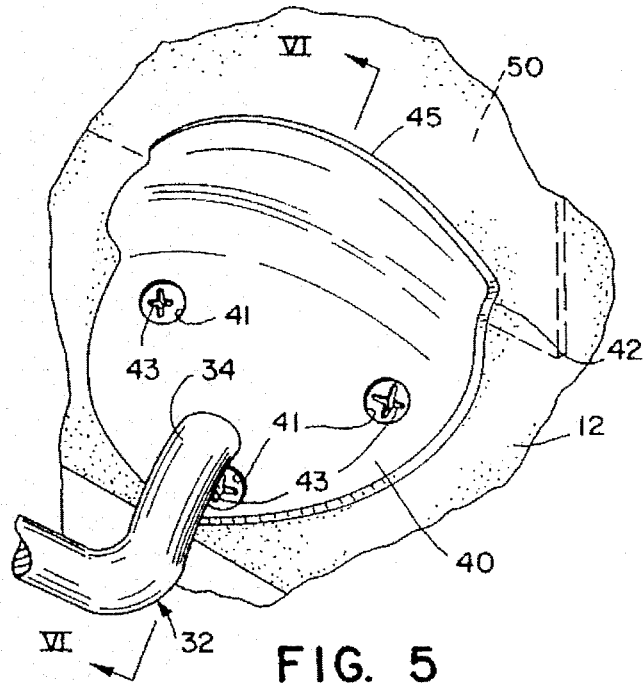
FIG. 5 is an enlarged fragmentary perspective view of the pivot rod mounting bracket shown in FIG. 1.

Mounting the visor body to the vehicle is an elbow bracket mounting assembly 30 including a generally L-shaped pivot rod 32 having a first leg 33 extending longitudinally along the upper edge and within the visor body and secured therein by a suitable torque control such as disclosed in U.S. Pat. No. 5,004,289 for allowing the visor to be moved between a raised stored position adjacent to vehicle roof 12 and selected lowered use positions such as illustrated in FIG. 1 for the passenger side visor shown. The elbow bracket assembly 30 secures the remaining shorter end 34 of pivot rod 32 to the vehicle and with the exception of the bezel as described in greater detail below may be generally of the type disclosed in U.S. Pat. No. 5,061,005 issued on Oct. 29, 1991 to Van Order et al., the disclosure of which is incorporated herein by reference. The elbow bracket assembly 30 includes a unique bezel 40 which includes an outwardly projecting flange 42 extending above the pivot rod 32 as best seen in FIG. 1 for receiving relatively flat planar objects such as a parking ticket 50, or other items to be stored. The integral storage clip so defined is described in greater detail below in connection with FIGS. 5 and 6.

Visor 20 also includes an auxiliary mounting bracket 60 mounted to the top edge 21 of the visor body at an end remote from elbow bracket assembly 30. Auxiliary mounting clip 60 provides a mounting rod 62 extending within a bezel 65 integral with the visor body and which snap-fits into a releasable socket 66 mounted to the vehicle roof above windshield 14 to allow the visor to pivot from the front windshield position shown to a side window position by bracket assembly 30. Thus rod 62 decouples from socket 66 allowing the movement of the visor to the side. U.S. Pat. No. 4,679,843 discloses one manner by which the auxiliary mounting rod 62 can be mounted to the visor body. Preferably rod 62 is integral with the bezel 65 which can be secured to the visor body using the pin structure disclosed in the above identified '843 patent.

Bezel 65 also includes a downwardly projecting flange 67 which is spaced outwardly from the inwardly facing surface 23 of the visor body for receiving thereunder planar objects such as a map 52 or the like. Having briefly described the visor 20 shown in FIG. 1, a detailed description of first the pivot elbow assembly followed by the auxiliary visor bracket is now presented initially in conjunction with FIGS. 5 and 6.

Figure 6:
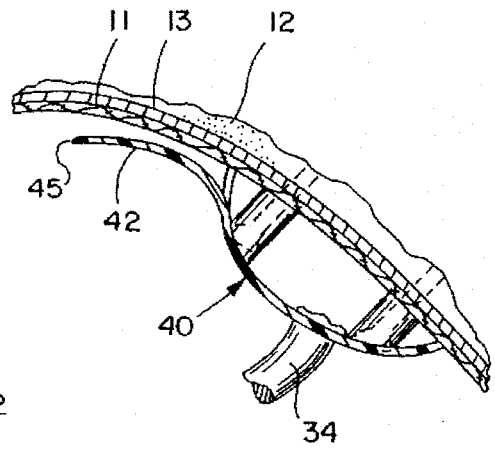
FIG. 6 is a cross-sectional view of the structure shown in FIG. 5 taken along section line VI—VI in FIG. 5.

The elbow bracket assembly 30 for mounting the pivot rod 32 to the vehicle roof 12 integrally includes a polymeric bezel 40 with apertures 41 formed therein for receiving fastening screws 43 attaching the bezel 40 to the snap-in fastener for securing the visor to the vehicle roof. This aspect of the visor construction forms no part of the present invention but is disclosed in detail in the above identified '005 patent as is the attachment of end 34 of pivot rod 32 to the bezel 40. Bezel 40 integrally includes a flange 42, which as best seen in FIG. 6, has an outwardly curved tip 45 spaced outwardly from the surface 11 of headliner 13 for ease of insertion of a flat planar object such as a parking ticket 50 or the like. Bezel 40 is molded of a suitable resilient polymeric material such as polycarbonate to allow flange 42 to flex slightly permitting such objects to be fitted thereunder in compression against the vehicle roof 12 which is covered by the headliner 13 having a fabric covered exposed surface 11. The headliner 13 is attached to roof 12 in a conventional manner in part supported by the visor bracket assembly 30. Thus, the visor assembly 20 provides at a convenient corner location, otherwise unused for storage, a visor elbow bracket mounting assembly which integrally includes storage for relatively small planar objects between the flange of the pivot mounting bracket bezel and the vehicle roof. Such heretofore unused storage location provides additional usefulness for the visor without interfering with the visor operation or other accessories which may be incorporated in the visor body including the illuminated vanity mirror package 25.

Figure 4:
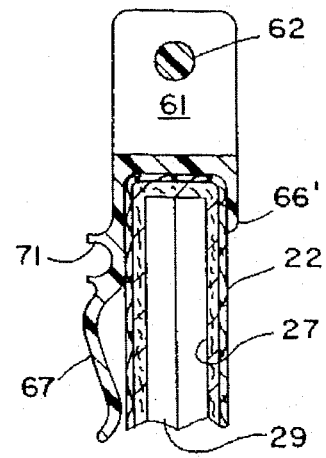
FIG. 4 is a cross-sectional view of the structure shown in FIG. 3 taken along section line IV–IV in FIG. 3.

The visor 20 may either additionally include or independently include the auxiliary visor storage clip 60 which is disclosed in greater detail in FIGS. 2–4. In the embodiment shown in FIG. 2, the auxiliary mounting rod 62 extends across an integrally molded generally U-shaped bezel 65 having a rear leg 66' extending over the back surface of the visor body, integral top walls 64 which are joined by a U-shaped side wall 61, and a front wall 65. Front wall 65 terminates in a outwardly extending flange 67 which is spaced from the surface of the visor body and terminates in a outwardly curved tip 69 for ease of insertion of objects under the storage clip so formed.

The entire auxiliary visor clip assembly 60 can be integrally molded with a central pin 70 (FIG. 2) extending through the hollow rod 62 for securing the clip assembly to the visor body with pin 70 being inserted into the visor body as disclosed in U.S. Pat. No. 4,679,843. Alternatively, the clip 60 can be attached directly to the visor body by ultrasonic welding, adhesives, or by suitable fasteners. A combination of such known fastening techniques can be used. Clip 60 thus allows the easy and convenient storage of planar objects such as a map 52 therein which is compressibly held within the resilient polymeric clip 60 and between flange 67 and the visor body.

In an alternative embodiment of the auxiliary clip 60 shown in FIGS. 3 and 4, the outer surface 68 of front wall 65 of the clip 60 includes a semicylindrical elongated socket 71 for receiving therein cylindrical objects such as a writing instrument such as a pencil 73 which can be snap-fitted into the resilient semi-circular socket 71 as illustrated in FIG. 3. FIG. 4 illustrates also the construction of the visor body which includes the folded core halves 27 and 29 covered by the upholstery material 22.

In yet another embodiment of the invention, a visor assembly 120 is shown in FIG. 7 and also includes an illuminated vanity mirror assembly 125. The visor assembly 120 is mounted to the roof 12 of a vehicle by means of a conventional pivot rod assembly 130 which includes a pivot rod 132 extending into the visor body for attaching the visor to the vehicle roof. Visor 120 may also include a conventional auxiliary visor mounting clip 140 at an end distal from pivot rod assembly 130. Visor body 120 may however also be of the type disclosed in pending U.S. Pat. No. 5,374,097 entitled Universal Visor Mounting System. Such visor mounting system integrally includes an illuminated vanity mirror package 125 in a mounting assembly which integrally includes the pivot rod mounting bracket 130. Such construction may additionally include an auxiliary storage clip 150 such as shown in FIGS. 7–9 which is a generally U-shaped member having a rear leg 152 (FIGS. 8 and 9), a top leg 154, and a front leg 156 extending downwardly on the surface 123 of visor 120 facing the interior of the vehicle when the visor is in a lowered use position as shown in FIG. 7. Leg 156 includes an outwardly extending and inwardly tapered flange 157 with an outwardly curved tip 159 for receiving thereunder relatively flat planar objects such as a map 160. Member 150 can thus be integral with the mounting bracket assembly disclosed in the above identified patent application the disclosure of which is incorporated herein by reference or as seen in FIGS. 7–9 can be mounted to the upper edge 121 of visor 120 by suitable means such as fasteners extending through the rear leg 152 into the visor core 127 (FIG. 9) or by suitable adhesives or the like. Flange 157 extends slightly outwardly from the front surface 123 of visor body 120 and its tip 159 allows the easy insertion of a map or the like under the resilient polymeric clip 150 which may be made of a polycarbonate or other suitable resilient polymeric material. Visor 20 as shown in FIGS. 1–6 may also include the clip 150 seen in FIGS. 7–9.

Thus, the present invention contemplates the integration of one or more storage clips integral with the visor mounting brackets and provides supplemental use for visors in areas which have heretofore been unused. It will become apparent to those skilled in the art that modifications to the preferred embodiments described herein can be made without departing from the spirit or scope of the invention as defined by the appended claims.

The embodiments of the invention in which an exclusive property or privilege is claimed are defined as follows.

We claim:

1. In a visor assembly with a mounting bracket having an integral storage clip, said visor assembly comprising:

a visor body including the mounting bracket, said mounting bracket including an elbow bracket assembly with a pivot rod having a first end inserted into said visor body for allowing said visor body to be moved between a raised stored position and a lowered use position, said pivot rod having an opposite end for attaching said visor body to a roof of a vehicle for allowing said visor body to be moved from a windshield position to a side window position, wherein the improvement comprises: said elbow bracket assembly including a bezel having a flange extending from an edge thereof in spaced relationship to the vehicle roof to define said integral storage clip for receiving a planar object under said flange to be held between said vehicle roof and said flange.

2. The visor assembly as defined in claim 1 wherein said flange includes a tip spaced outwardly from a headliner of the vehicle to which said visor assembly is mounted.

3. The visor assembly as defined in claim 2 wherein said bezel includes means for receiving said opposite end of said pivot rod.

4. The visor assembly as defined in claim 3 wherein said bezel includes means for attaching said bezel to the roof of the vehicle.

5. A visor comprising:

a visor body including an elbow bracket assembly for mounting said visor body to a vehicle roof for allowing said visor body to be moved between a raised stored position and a lowered use position; and an auxiliary visor clip mounted to an edge of said visor body remote from said elbow bracket assembly for supporting an end of said visor body remote from said elbow bracket assembly, said auxiliary visor clip including a bezel having a flange extending from an edge thereof in spaced relationship to said visor body for receiving a planar object under said flange to be held between said visor body and said flange.

6. The visor as defined in claim 5 wherein said flange includes a tip extending away from said visor body for facilitating insertion of the planar object under said flange.

7. The visor as defined in claim 5 wherein said flange includes an outer surface having a semicylindrical socket formed therein for holding objects to said flange.

8. The visor as defined in claim 5 wherein said elbow bracket assembly has a bezel including a flange for holding objects between said flange of said elbow bracket assembly bezel and the vehicle roof.

9. The visor as defined in claim 8 wherein said flange of said elbow bracket assembly includes a tip extending away from the vehicle roof to facilitate insertion of the objects under said flange of said elbow bracket assembly.

10. A visor having a mounting bracket with an integral storage clip comprising:

a visor body including the mounting bracket, said mounting bracket including an elbow bracket assembly having a pivot rod with a first end inserted into said visor body for allowing said visor body to be moved between a raised stored position and a lowered use position, said assembly further including a bezel for attaching an opposite end of said pivot rod to a roof of a vehicle for allowing the visor to be moved from a windshield position to a side window position, wherein said bezel has an integral flange extending from an edge thereof in spaced relationship to the vehicle roof to define the integral storage clip for receiving a planar object under said flange to be held between said vehicle roof and said flange.

11. The visor as defined in claim 10 and further including an auxiliary visor clip mounted to an edge of said visor body remote from said elbow bracket assembly for supporting an end of said visor body remote from said elbow bracket assembly, said auxiliary visor clip including a bezel having a flange extending from an edge thereof in spaced relationship to the visor body for receiving a planar object to be held between said visor body and said flange of said bezel of the auxiliary visor clip.

12. The visor as defined in claim 11 wherein said flange of said bezel of said elbow bracket assembly includes an outwardly extending tip to facilitate insertion of the planar object thereunder.

13. The visor as defined in claim 12 wherein said flange of said bezel of said auxiliary visor clip includes an outwardly extending tip to facilitate insertion of the planar object thereunder.

14. The visor as defined in claim 13 wherein said flange of said bezel of said auxiliary visor clip includes a semicylindrical socket formed therein for attaching objects to said flange of said bezel of said auxiliary visor clip.

15. A visor for mounting to a roof of a vehicle, said visor having an integral storage clip, said visor comprising:

a visor body including an elbow bracket assembly extending from one end thereof for attachment of said visor body to the roof of the vehicle, said visor body having a longitudinally extending edge which is proximate to the roof of the vehicle when the visor is installed in the vehicle; and a generally U-shaped clip having a pair of legs joined by a base such that said legs extend over said edge of said visor in engagement with said visor body for holding said clip thereon, wherein a first leg of said clip faces an interior of the vehicle when the visor is in a lowered use position and said first leg includes an outwardly projecting flange allowing planar objects to be extended under said first leg of said clip and be held between said first leg and said visor body, said U-shaped clip further including a visor mounting rod.

16. The visor as defined in claim 15 wherein said elbow bracket assembly includes a bezel having a flange extending from an edge thereof in spaced relationship to the vehicle roof for receiving a planar object under said flange of said bezel of said elbow bracket assembly to be held between said vehicle roof and said flange.

17. A visor for mounting to a roof of a vehicle, said visor having an integral storage clip, said visor comprising:

a visor body including an elbow bracket assembly extending from one end thereof for attachment of said visor body to the roof of the vehicle, said visor body having a longitudinally extending edge which is proximate to the roof of the vehicle when the visor is installed in the vehicle; and an auxiliary visor clip mounted to said edge of said visor body remote from said elbow bracket assembly for supporting an end of said visor body remote from said elbow bracket assembly, said auxiliary visor clip including a bezel having a flange extending from an edge thereof in spaced relationship to the visor body for receiving a planar object under said flange of said auxiliary visor clip to be held between said visor body and said flange of said auxiliary visor clip.

18. The visor as defined in claim 17 wherein said flange of said auxiliary visor clip includes a semicylindrical socket for attaching an object to said auxiliary visor clip.

19. The visor as defined in claim 18 wherein said flange associated with said bezel of said auxiliary clip includes an outwardly extending tip.

* * * * *